Figure 1:
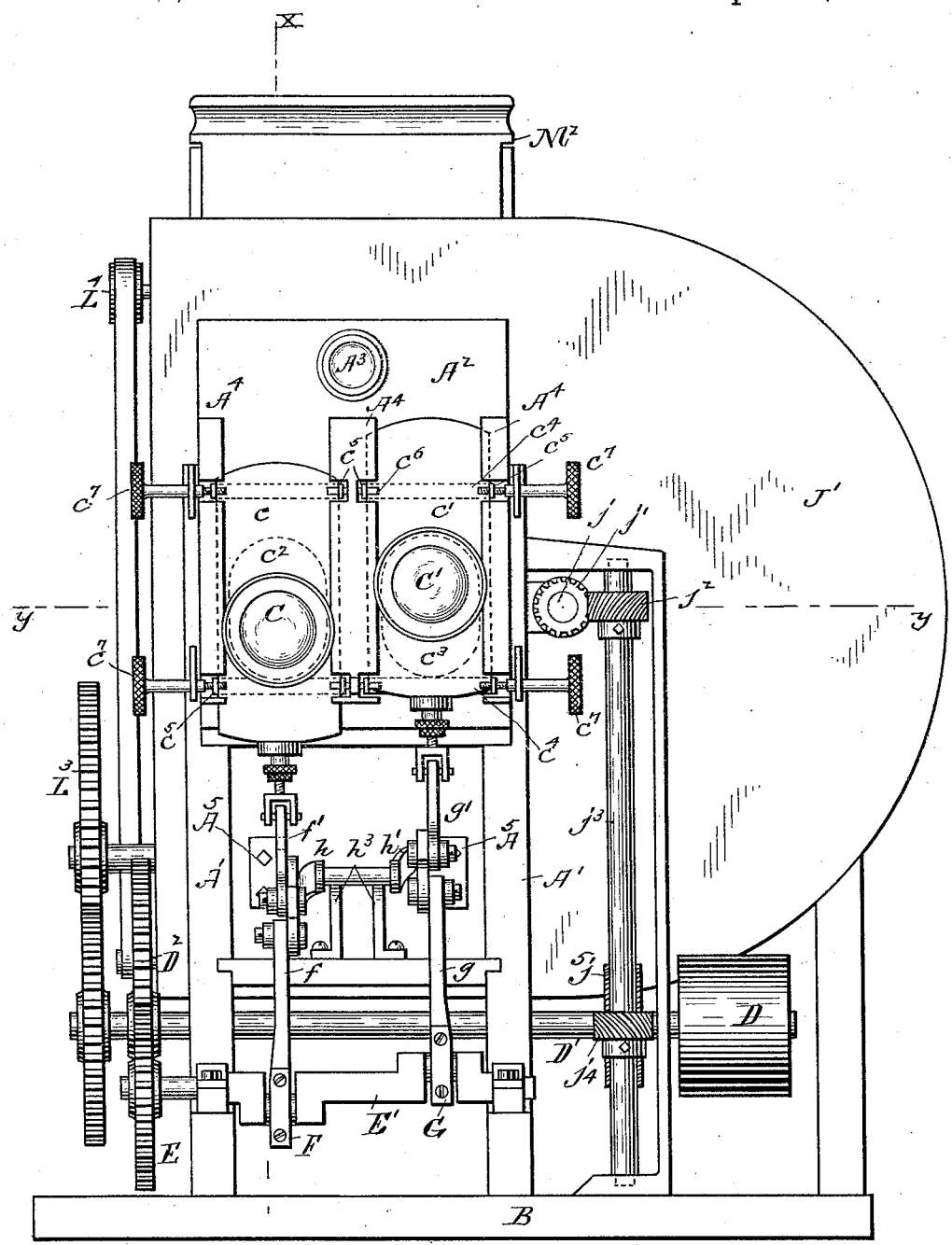

(No Model.) 5 Sheets—Sheet 4.

O. A. EAMES.
CAMERA LANTERN.

No. 546,093. Patented Sept. 10, 1895.

WITNESSES.
Wm. O. G. Trah
Eva A. Guild

INVENTOR
Owen A. Eames (No Model.) 5 Sheets—Sheet 5.

O. A. EAMES.
CAMERA LANTERN.

No. 546,093. Patented Sept. 10, 1895.

WITNESSES. INVENTOR

UNITED STATES PATENT OFFICE.

OWEN A. EAMES, OF BOSTON, MASSACHUSETTS.

CAMERA-LANTERN.

SPECIFICATION forming part of Letters Patent No. 546,093, dated September 10, 1895.

Application filed March 25, 1895. Serial No. 543,039. (No model.)

*To all whom it may concern:*

Be it known that I, OWEN A. EAMES, of Boston, in the county of Suffolk and State of Massachusetts, have invented a new and useful improvement in camera-lanterns for exhibiting upon a screen a continuous series of pictures representing objects in motion, of which the following is a specification.

So far as I am aware the only methods of exhibiting a consecutive series of pictures for the purpose of representing objects in motion have been based upon that property of the eye known as "persistence of vision"—that is to say, the theory that during a short period of time the eye will retain an impression formed by the rays of light from a bright image, so that in an exhibition of a series of these impressions it is possible to allow an instant of time to elapse between the recurring images, during which the mechanism can operate to change the pictures that form the impressions and yet the eye will not detect the fact that a change is taking place. In order to make these methods work smoothly, however, a large number of pictures must be shown in each second regardless of whether the objects are represented as moving very rapidly or slowly. The reason for this is evidently on account of the interruption or breaks which occur while the pictures are changing, and which, if prolonged by reducing the speed of the machines, would cause that jerkiness that spoils the effect of motion.

My invention hereinafter described ignores this theory, for I have found that it is possible to so change from one picture to another that there shall be no break in the series and consequently that there shall be actually, and in fact, a continuous series of impressions made upon the eye. As a result, the impressions may be made of longer duration, giving greater brilliancy to the image as they overlap or use up the time which heretofore has been occupied in changing the pictures. With my method I have also found that it is not necessary in all cases to show a large number of pictures a second as they can be timed approximately to the rapidity of movement of the object, it being necessary to show only such changes of position as will lead the eye smoothly over the series.

The methods for taking or exhibiting a series of pictures representing moving objects have also been based upon the theory that while the film must travel with sufficient rapidity to make possible a comparatively large number of exposures or projections a second, it must be rendered stationary with reference to the lens at the instant of exposure, and this theory has been carried out either by stopping the movement of the film absolutely during the exposure or exhibition, and starting it again or by causing the rolls which carry the film to travel upward at that time as the film travels downward, so that a given point on the film would, while this operation was taking place, remain stationary with reference to the lens; then by closing the lens with a shutter for an instant the film feeding mechanism would be caused to resume its lower position again, and upon a fresh exposure of that lens taking place a new portion of the film feed would lie behind the lens and the upward traveling of the film-feed would begin again. Thus in such a case there must be an instant of darkness while the feed-film is recovering its initial position. Neither of these processes is mechanically satisfactory, although theoretically either of them is amply so. In the first case while the film is traveling it must travel very rapidly and there is a constant jar whenever it stops or whenever it starts again, which has a bad effect upon the film. In the second case the combined weight of the film and the film-feeding mechanism renders any attempt to feed it upward as rapidly as is necessary, as the film is being exposed, quite difficult, except with very accurate and very strong carefully-made mechanism. Moreover, the effect of the jar incidental to the rapid traveling of the film-carrying mechanism is considerable, it being remembered, of course, that any jar to the plate or film is magnified through the lens upon the screen, in case a series of pictures are being projected, and there is consequently a bad result.

My present invention is based upon the theory that it is possible to so arrange a lens or lenses, with reference to the film and the object or screen, that while the film is being fed at an excedingly rapid rate the lens may be made to travel in the same direction at a rate of speed necessary to cause, say, the central point of the lens to lie always in a line connecting the central point of the field on the film with the established center of the field on the object or screen. When the parts are properly adjusted in this respect, there will be a time during which each lens will be covered by the shutter while it is resuming its original position and is becoming ready to travel down with the next section of the film; but each lens may be exposed at the instant the other lens has been covered, and hence there need be no break in the continuity of the exposure or projection. In embodying this idea I have found it convenient to use two lenses, which shall travel alternately up and down, and a film which is wide enough to take two rows of pictures side by side, and I have used with these lenses a shutter which is provided with two openings, one for each lens, so arranged with reference to each other that the instant one lens has reached, say, its lowest position, at which instant the shutter has covered it, the other lens, being at that instant in its highest position, is uncovered by the shutter. Thus I have shown that there need be no time during which one or the other of the lenses is not at work. I prefer to use a rotary shutter, as the mechanism for moving it is simpler than that of a reciprocating shutter, or, at least, can be more conveniently arranged, and I also prefer to protect from the light such parts of the film as are not in the field of an uncovered lens by what I shall hereinafter describe as a diaphragm. Moreover, it will be evident to those skilled in the art that my apparatus, which I shall describe as a lantern, may be used as a camera, operating in this case in exactly the same way, in so far as the operation of lenses and film are concerned.

I have shown in the drawings what now seems to me the simplest and best method of operating the various parts above referred to; but as the motions to be given to these parts are motions well known in mechanics it is evident that they may be given by other means than those hereinafter described, the main feature of the invention being the relative timing of the various operations rather than the means by which they are accomplished.

Figure 2:
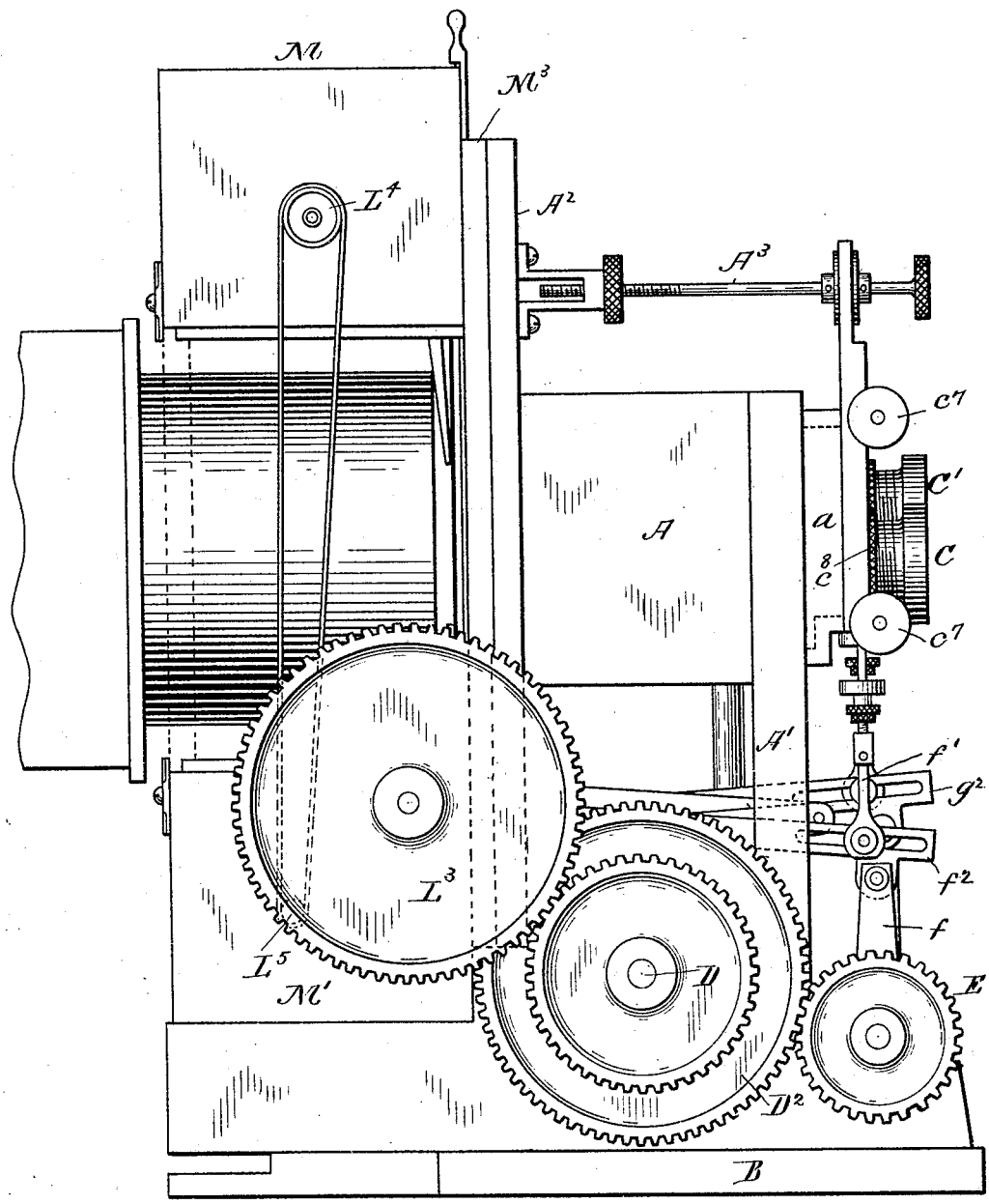
Figure 3:
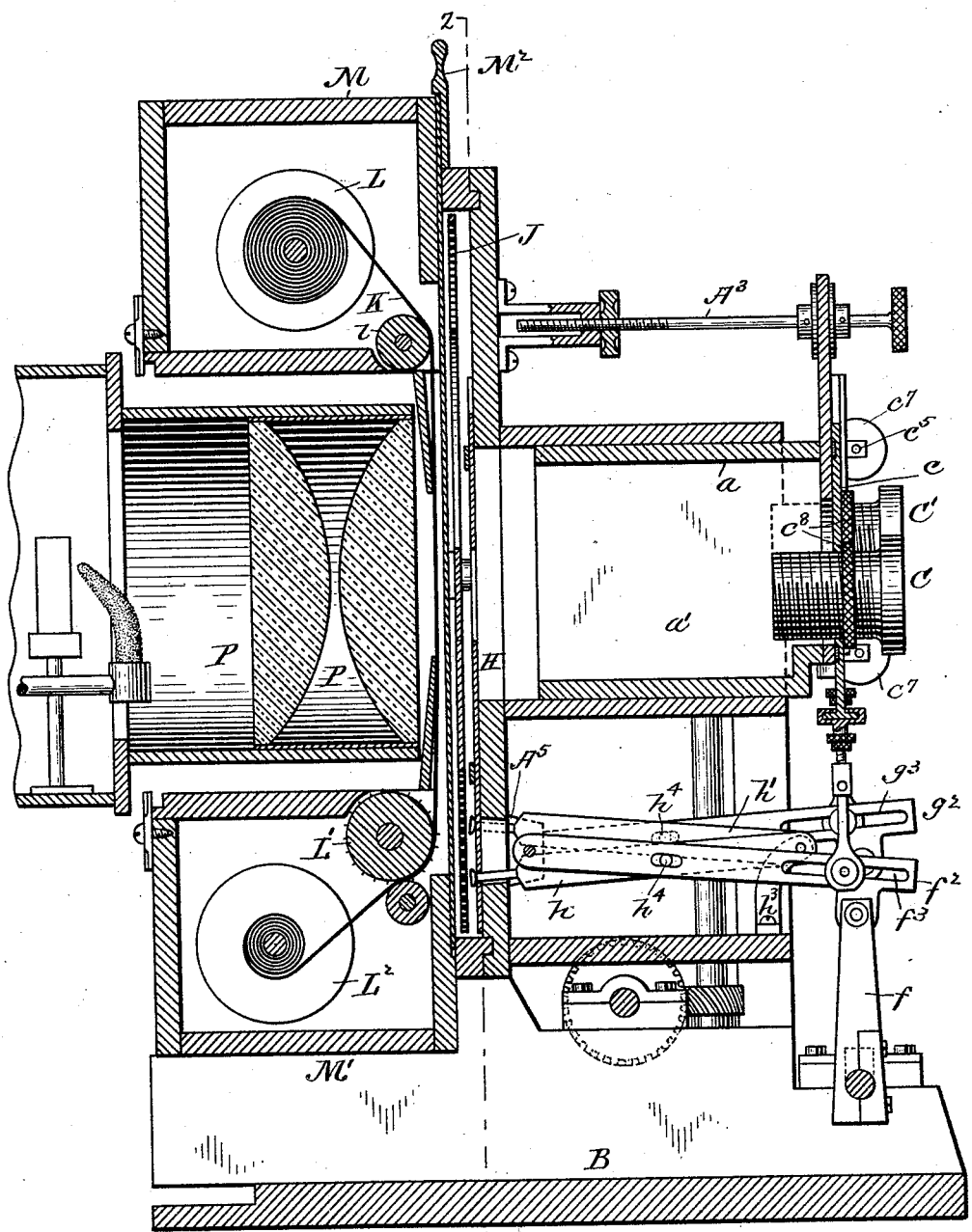
Figure 4:
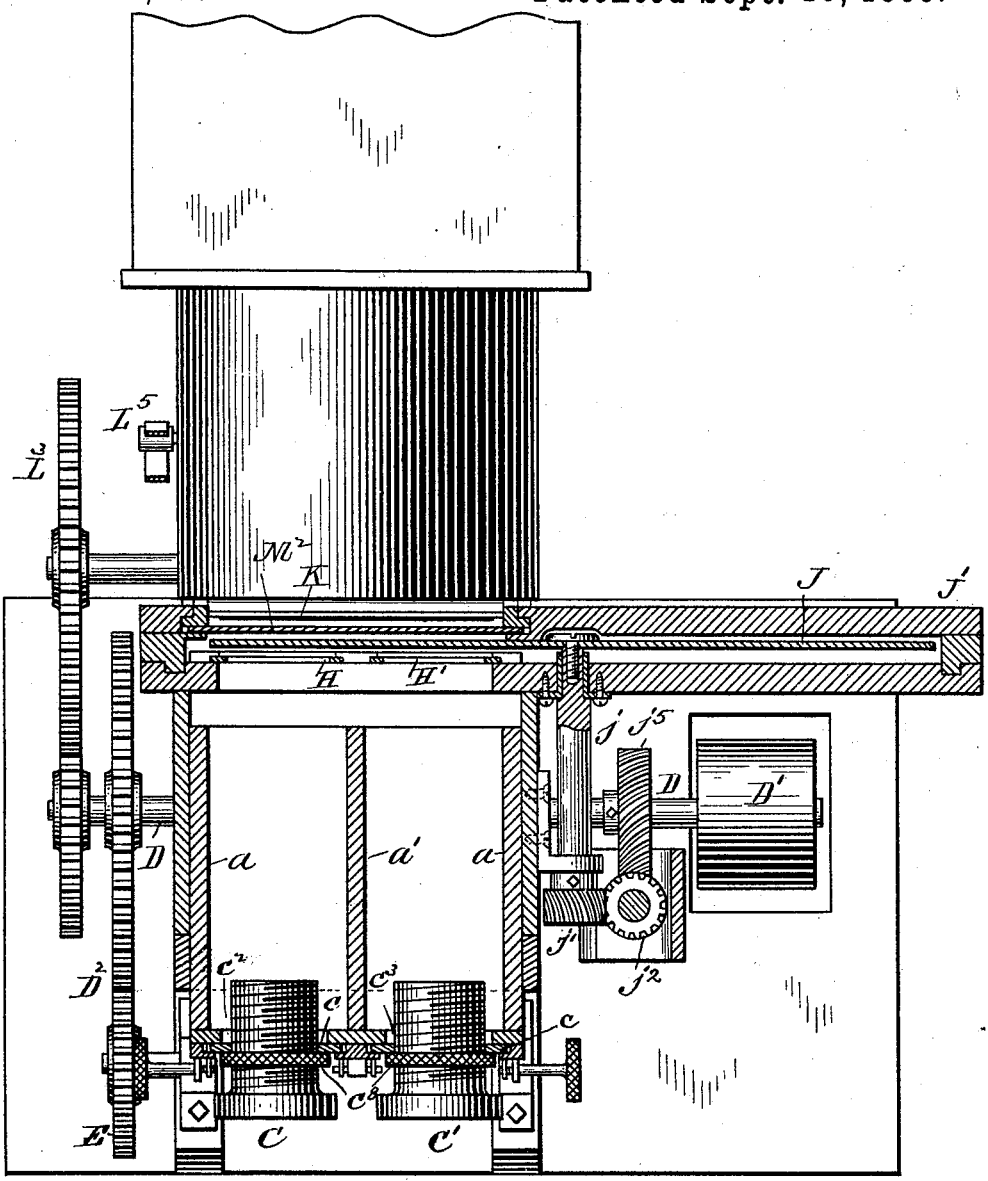
Figure 5:
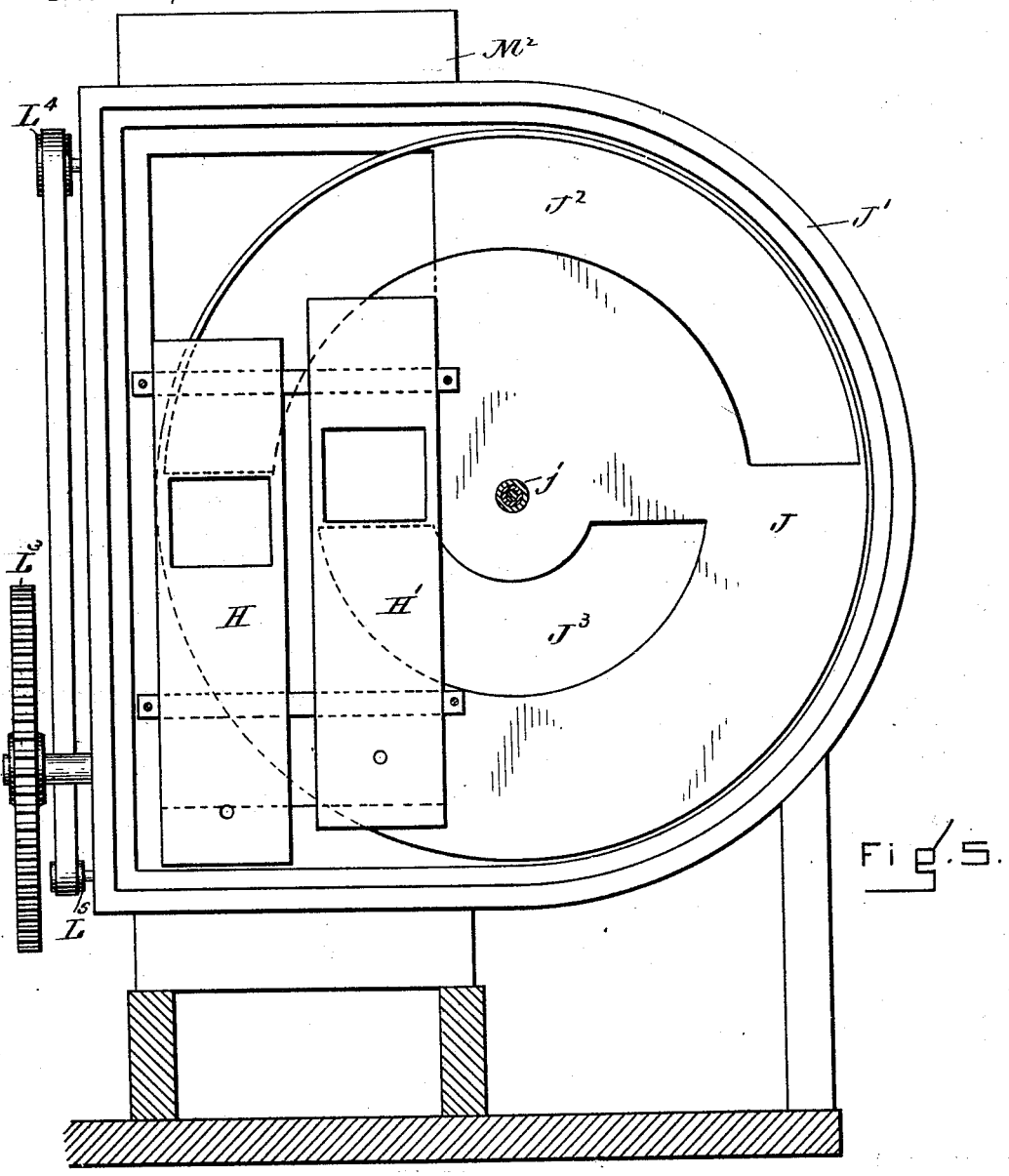
Figure 6:
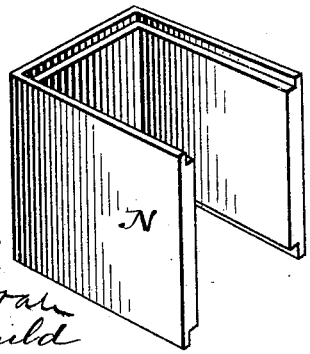
Figure 7:
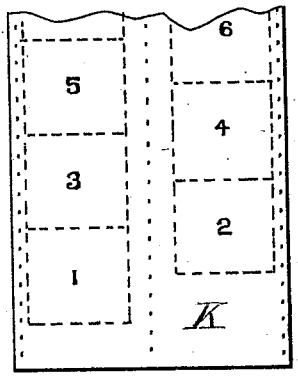

In the drawings, Figure 1 is a front elevation and Fig. 2 is a side elevation of a camera-lantern embodying my invention and adapted to carry out the method above described. Fig. 3 is a vertical section on line $x\ x$ of Fig. 1, and Fig. 4 is a horizontal section on line $y\ y$ of Fig. 1. Fig. 5 is a section on line $z\ z$ of Fig. 3. Fig. 6 is a perspective view of the back piece N, and Fig. 7 is a view of a portion of the film, showing the arrangement of the pictures thereon.

A is the camera-box. It is supported on a base B by suitable supports $A'$. Its front piece $A^2$ carries two lenses C C', and is provided with a tube $a$, which slides in the box so as to focus the lenses. A partition $a'$, located between the lenses and suitably mounted, divides the tube into two chambers, each independent of the other and each having its own lens.

The lenses are focused primarily by moving the tube, which may be done by hand or by means of a screw mechanism $A^3$ of ordinary construction. (Shown especially in Figs. 2 and 3.)

Each lens-tube C C' is mounted in a slide $c\ c'$. It is threaded about its entire length, and I prefer to so construct the apparatus that ordinarily each tube will project about equal distances on both sides of its slide. Being threaded each lens may be focused very accurately by giving it one or two turns in the slide after both have been approximately focused by moving the tube $a$. A set-nut $c^8$ is provided to prevent the tube from jarring out of place. The slides $c\ c'$ are mounted in ways $A^4$ on the front $A^2$ of the box, which is provided with openings $c^2\ c^3$ suitably shaped and placed to allow the lenses to reciprocate.

A reciprocating motion is given to the slides $c\ c'$ in the following manner: D is the main shaft, to which power is applied by a belt on the pulley $D'$ or in some other way. On this shaft D is mounted a gear $D^2$ in mesh with a gear E on the crank-shaft $E'$. This crank-shaft carries two cranks F and G, one below each of the lenses. Each lens-slide $c\ c'$ is connected with its crank by means of suitable connecting mechanism. The distance which each lens is to travel should be adjustable, and for this purpose I have made these rods in two parts—a lower part $f\ g$ and an upper part $f'\ g'$—and I have connected the upper and lower parts together by means of a lever $f^2\ g^2$. The rear end of each of these levers $f^2\ g^2$ is hinged to the bracket $A^5$, and the front end of these levers is slotted, as shown at $f^3\ g^3$, so that the lower end of the connecting-rod $f'\ g'$ may be adjustably attached to its lever by a suitable set-screw, the upper end of the connecting-rod $f\ g$ being pivotally connected to a projection from its lever, as shown in Fig. 3.

I prefer to connect each slide $c\ c'$ to its connecting-rod $f'\ g'$ by a universal adjustable connection, so that the exact length of that rod may be changed if thought best, and the rod may have free play without binding in any way as it is moved up and down.

In order to adjust the lenses laterally, in case that should be necessary, I prefer to set each slide $c\ c'$ into spreaders $c^4$, in which it slides. Each spreader consists of a flat piece, which lies behind the slide and is provided with two ears $c^5$, one at each end, which straddle the slide. The ear upon the inner end of each spreader slides upon the pin $c^6$. At its other end I provide a thumb-screw $c^7$, which passes through a stationary ear in the board $A^2$, and also through the other ear of the spreader, so that by turning the thumb-screw the lateral position of the lenses may be adjusted. The ways $A^4$ should be so constructed as to allow considerable lateral movement to the lenses, but otherwise should hold the lenses firmly against the board $A^2$, the spreaders serving to hold the slides laterally.

In rear of the lenses and operated by the same mechanism as reciprocates them, are two diaphragms H H'. These diaphragms are mounted in the rear of the box in suitable ways and each slides vertically as its lens slides, as shown. They are moved by means of levers $h\ h'$, each of which is pivoted in front to the support $h^3$, and at its rear end is connected to its diaphragm. Each lever $h\ h'$ is provided with a pin $h^4$, which lies in the slot in one of the lens-levers $f^2\ g^2$, so that as each lens reciprocates a corresponding reciprocating movement is given to its diaphragm. Each diaphragm is provided with an opening exactly the shape of the field, and it is so constructed and arranged as to exclude light from every part of the film except the field which is being projected.

In rear of the diaphragm is a rotary shutter J. (Shown in elevation in Fig. 5.) This shutter is mounted in a suitable light-tight casing J' upon a shaft $j$, which is provided at its forward end with a spiral gear $j'$, operated from the main shaft D by means of the spiral gear $j^2$, shaft $j^3$, and spiral gears $j^4\ j^5$. This shutter J may be said to be divided into two segments, and in each segment there is an opening $j^2\ j^3$ occupying nearly one-half a circle. One opening is arranged to expose the lens C and the other the lens C', and they are so arranged with respect to each other that as the lens C is closed by its dark-segment, the light-segment $J^3$ opens the lens C'. By this means there is practically a continuous projection upon the screen.

The film K is rolled upon a supply-roll L mounted in a light-tight box M in the upper rear part of the apparatus, and it passes down over a guide-roll $l$ and feed-roll L' and is finally wound upon a receiver-roll $L^2$. A gear $L^3$, mounted upon the shaft of the feed-roll L' and engaging with a suitable gear upon the main shaft, gives motion to the feed-roll, which causes it to draw the film from the supply-roll, and a belt connecting a pulley $L^4$ mounted on the supply-roll furnishes power to a smaller pulley $L^5$ on the receiver-roll to wind the film. The feed-roll should be provided with pins or otherwise adapted to bite and draw down the film accurately and regularly.

The receiver-roll and feed-roll are both contained in a light-tight box M' located near the base of the apparatus, the two boxes M M' being attached together by the frame $M^3$, which is detachably connected to the rear of the camera, and being provided with a slide $M^2$ of ordinary construction, so that these boxes may be filled in the dark room and then attached to the camera in all respects like the ordinary plate-holder. Thus the apparatus may be used as a camera as well as a lantern. When used as a camera a three-sided hood N (shown in reduced scale in Fig. 6) is secured in place behind the film and between the boxes M M', so as to form a light-tight back for the film. In this case the condensers P will, of course, not be used.

I use my apparatus to project positives in the following manner: Having filled the supply-roll L with a film and placed the source of light in position, the condensers P being placed as shown, I attach my film-holder to the rear of the camera, the slide $M^2$ being, of course, withdrawn. Upon applying power to the main shaft D the shutter is caused to revolve, the lenses and their diaphragms are caused to reciprocate alternately up and down, and the film is fed. The result is that as the portion of the film which is marked 1 in Fig. 7 moves down behind the opening in the diaphragm H, the opening $J^2$ in the shutter J moves up to meet it and the lens C also moves down somewhat slower than the film until it reaches a point where the light is cut off from it by that part of the shutter J which has, in the meantime, come round to take the place of the openings $J^2$; but at this instant the crank motion has lifted the lens C' and its diaphragm H' and has placed the opening in the diaphragm over that portion marked 2 on the film K, and at this instant the opening $J^3$ of the shutter has come round and prepares in the same way to open the lens C' and expose the second positive. These two operations are repeated continuously so long as the length of film will allow, the film and diaphragm all this time traveling at a regular rate in proportion to the movement of the lenses and shutter. This downward movement of the diaphragm must equal in speed and distance the movement of the film.

It will be seen that as constructed it is necessary to give a slight motion to the lens, an extreme motion of only one-half the height of the picture being necessary, this being due to the fact that while one field is being exposed and is traveling down the next field is also traveling down, so that it meets its upward-coming lens and is ready to be exposed the instant the first field has moved out of the way. Thus the picture-carrying film is peculiar, in that it has, as is shown in Fig. 7, a row of pictures for each lens, the pictures in one row being arranged with their centers not in the same straight line with the pictures in the next row, but arranged so that the center of one picture or field is on a line with the bottom of the next-following picture. Thus the picture or fields of one row may be said to overlap the fields in the next row.

I have used the term "field" to include both the positive and the negative or portion of the film to be exposed to take a negative, for those skilled in the art will see, upon careful consideration, that this same mechanism may be used equally well to take negatives, the apparatus in this case being located at a suitable distance from the object, and the motion of the lenses being so adjusted that the successive negatives will be taken at regular intervals, as shown in Fig. 7. Moreover, it will be seen that when used as a camera a stationary picture is taken, although the lens is moving. It will be seen that the series of negatives taken by an apparatus like the above is practically without break—that is to say, at no time is there an instant of darkness between the taking of the negatives. As the shutter closes one lens it begins to open the other. This is not only important with regard to taking the negatives, but it is more important when it comes to projecting the positive upon a screen, because it allows a constant passage of light through either one lens or the other, there being practically no period of darkness. This is very important, for while in apparatus which has heretofore been tried in which there is a period of darkness not long enough to be appreciated as such, but in fact existing, the result has been to seriously lessen the amount of light which is apparently thrown upon the screen, the period of darkness and the period of light, as it were, blending together and producing an average impression upon the eye of considerably less light than the lantern would warrant. By my method, above described, in which the light is practically never cut off, owing to the shape of the openings in the shutter and the position of the lenses, this period of darkness being reduced to the minimum, the only obstruction to the light is that due to the ordinary amount of opaqueness of the positives.

What I claim as my invention is—

1. In a camera lantern, a pair of reciprocating lenses, a film feed located to feed a film in rear of said lenses, a shutter adapted to expose said lenses alternately and a pair of reciprocating diaphragms provided with openings and located to screen all of the film except that portion which is to form the field, all as and for the purposes set forth.

2. In a camera lantern, in combination with a pair of reciprocating lenses and means whereby they are reciprocated, a pair of reciprocating diaphragms located one in rear of each lens, each provided with an opening the size of the negative to be taken, and means whereby they are reciprocated in unison with said lenses, in combination with a film feed, all as and for the purposes set forth.

3. In combination with a pair of lenses adapted to be reciprocated and a pair of diaphragms also adapted to be reciprocated, the levers $f^2$, $g^2$ connected with suitable rocking mechanism and to said lenses in substantially the manner described, and the levers $h$ $h'$ suitably supported and connected to said levers $f^2$ $g^2$, and said diaphragm, all as and for the purposes set forth.

4. In a camera lantern, in combination with mechanism for feeding a film, a lens adapted to be reciprocated in a plane parallel to the plane of the traveling film and mechanism whereby said lens is alternately opened and closed all as and for the purposes set forth.

5. A film having a series of fields arranged in rows as shown, the fields in each row overlapping the fields of the next row, as set forth.

6. That method of taking negatives on a constantly traveling film which consists in causing a lens to be moved in relation to the film in the same direction therewith and in a plane parallel to the plane of that portion of the traveling film which is in the field of the lens, whereby the image received upon the film through the moving lens retains a stationary position upon the film during exposure, as described.

7. That method of exhibiting an indefinite number of consecutive pictures of objects in motion which consists in causing a picture bearing film to be passed continuously behind a pair of lenses which are given an alternate reciprocating movement in directions with and contrary to the motion of the film and exposing at any one time only so much of the film as lies in the field of the lens moving in the direction with the film, whereby a portion of the film is continuously exposed and a series of pictures, without break, is projected, as described.

In testimony whereof I have set my hand this 23d day of March, 1895.

OWEN A. EAMES.

Witnesses:
WM. L. WOOLLETT,
GEORGE O. G. COALE.